United States Patent
Ryu et al.

(10) Patent No.: US 9,178,388 B2
(45) Date of Patent: Nov. 3, 2015

(54) WIRELESS POWER TRANSMISSION APPARATUS

(75) Inventors: Young Ho Ryu, Yongin-si (KR); Eun Seok Park, Suwon-si (KR); Sang Wook Kwon, Seongnam-si (KR); Young Tack Hong, Seongnam-si (KR); Nam Yun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 998 days.

(21) Appl. No.: 12/967,682

(22) Filed: Dec. 14, 2010

(65) Prior Publication Data

US 2011/0140543 A1    Jun. 16, 2011

(30) Foreign Application Priority Data

Dec. 14, 2009   (KR) .................. 10-2009-0124270

(51) Int. Cl.
*H01F 27/42*   (2006.01)
*H02J 17/00*   (2006.01)
*H01Q 15/00*   (2006.01)

(52) U.S. Cl.
CPC ............ *H02J 17/00* (2013.01); *H01Q 15/0086* (2013.01)

(58) Field of Classification Search
CPC ................. H02J 7/00; H01Q 15/0086
See application file for complete search history.

(56) References Cited

U.S. PATENT DOCUMENTS

| | | | |
|---|---|---|---|
| 7,307,589 B1 * | 12/2007 | Gregoire et al. | ....... 343/700 MS |
| 7,936,095 B2 | 5/2011 | Kawabata | |
| 8,185,755 B2 | 5/2012 | Yamasuge | |
| 2009/0015075 A1 | 1/2009 | Cook et al. | |
| 2009/0243397 A1 | 10/2009 | Cook et al. | |
| 2009/0303154 A1 | 12/2009 | Grbic et al. | |
| 2009/0303693 A1 * | 12/2009 | Mao | .............................. 361/818 |
| 2011/0046438 A1 | 2/2011 | Iwaisako | |

FOREIGN PATENT DOCUMENTS

| | | |
|---|---|---|
| JP | 2002-137659 | 5/2002 |
| JP | 2004-159456 A | 6/2004 |
| JP | 2007-267110 A | 10/2007 |
| JP | 2008-206219 | 9/2008 |
| JP | 2009-004512 | 1/2009 |
| JP | 2009-100445 A | 5/2009 |
| JP | 2009-253762 A | 10/2009 |
| JP | 2009-273213 A | 11/2009 |
| KR | 10-2009-0027312 | 3/2009 |
| KR | 10-2009-0038027 A | 4/2009 |

OTHER PUBLICATIONS

Sievenpiper, Dan; Lijun Zhang; Broas, R. F J; Alexopolous, N. G.; Yablonovitch, E., "High-impedance electromagnetic surfaces with a forbidden frequency band," Microwave Theory and Techniques, IEEE Transactions on , vol. 47, No. 11, pp. 2059,2074, Nov. 1999.*

(Continued)

*Primary Examiner* — Daniel Cavallari
(74) *Attorney, Agent, or Firm* — NSIP Law

(57) ABSTRACT

Provided is a wireless power transmission apparatus, including a source unit including a power resonator to transmit a wireless power to a target apparatus, and a near field controller to control a direction of a magnetic field of the power resonator.

12 Claims, 14 Drawing Sheets

(56) References Cited

OTHER PUBLICATIONS

International Search Report issued on Aug. 24, 2011, in counterpart Application No.: PCT/KR2010/008905 (3 pages, in English).
Chinese Office Action issued on May 6, 2014 in counterpart Chinese Application No. 201080056782.0 (9 Pages in English, 7 Pages in Chinese).
Japanese Office Action issued on Jun. 17, 2014 in counterpart of Japanese Application No. 2012-544377. (3 Pages in Japanese).
Japanese Office Action mailed Jan. 13, 2015 in counterpart Japanese Application No. 2012-544377 (4 pages, in Japanese, with English translation).

* cited by examiner

WIRELESS POWER TRANSMISSION APPARATUS

CROSS-REFERENCE TO RELATED APPLICATION(S)

This application claims the benefit under 35 U.S.C. §119 (a) of Korean Patent Application No. 10-2009-0124270, filed on Dec. 14, 2009, in the Korean Intellectual Property Office, the entire disclosure of which is incorporated herein by reference for all purposes.

BACKGROUND

1. Field

The following description relates to a wireless power transmission system, and more particularly, to a wireless power transmission apparatus that may control a direction of a magnetic field generated by a resonator in a wireless power transmission system.

2. Description of Related Art

With the development of Information Technology (IT), a variety of portable electronic devices have been released, and distribution of the various portable electronic devices has also increased. Due to characteristics of the portable electronic devices, battery performance of a corresponding portable electronic device is becoming an issue. In addition to the portable electronic devices, many home electronic appliances have a function of wirelessly transmitting data, and can be supplied with power over a power line.

Recently, research has been conducted on wireless power transmission technologies that may wirelessly supply power. Due to characteristics of a wireless power transmission environment, peripheral apparatuses may be influenced by a magnetic field of a wireless power transmission apparatus.

Accordingly, there is a desire for a wireless power transmission apparatus that may reduce an influence on peripheral apparatuses due to the characteristics of the wireless power transmission environment.

SUMMARY

Provided is a wireless power transmission apparatus to control a direction of a near field generated by a resonator.

Additional aspects will be set forth in part in the description which follows and, in part, will be apparent from the description, or may be learned by practice of the various example embodiments.

The foregoing and/or other features and utilities may be achieved by providing a to wireless power transmission apparatus that includes a source unit including a power resonator to transmit wireless power to a target apparatus, and a near field controller to control a direction of a magnetic field of the power resonator.

At least a portion of the near field controller may have a High Impedance Surface (HIS) characteristic.

The near field controller may control a direction of a magnetic field of the source unit based on a location of the target apparatus.

The near field controller may be designed so that the magnetic field of the source unit may have an in-phase characteristic with respect to the near field controller.

The near field controller may include a side focusing unit to control a direction of a side magnetic field of the source unit, and a rear surface focusing unit to control a direction of a rear surface magnetic field of the source unit.

The near field controller may further include a direction adjusting unit to adjust a direction of the side focusing unit and a direction of the rear surface focusing unit.

The near field controller may control the direction adjusting unit based on a location of a target resonator in the target apparatus.

The near field controller may move relative to the source unit.

The near field controller may move according to a location of the target resonator in the target apparatus.

The foregoing and/or other features and utilities may also be achieved by providing a method of transmitting wireless power, the method including transmitting the wireless power from a source unit to a target apparatus, and controlling a direction of a magnetic field of the source unit with a near field controller.

The controlling of the direction of the magnetic field may include moving the near field controller relative to the source unit.

The near field controller may be moved according to a location of a target resonator in the target apparatus.

The near field controller may have a High Impedance Surface (HIS) characteristic.

The near field controller may control a direction of the magnetic field based on a location of the target apparatus.

Other features and aspects will be apparent from the following detailed description, the drawings, and the claims.

Figure 1:
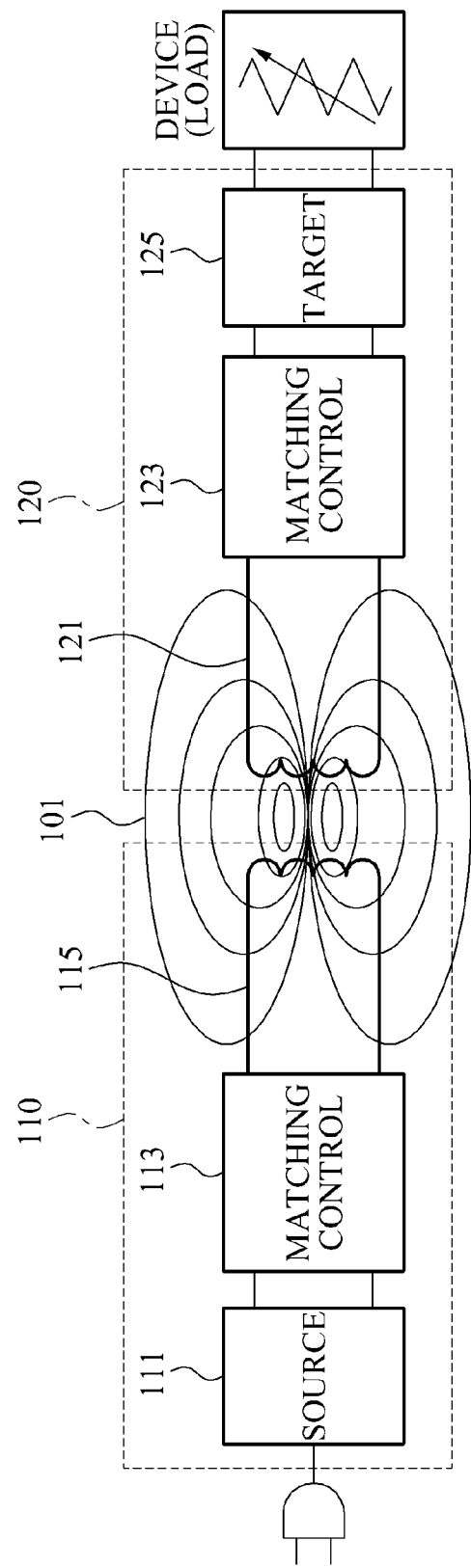
FIG. 1 is a diagram illustrating an example of a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of operations is not limited to that set forth herein and may be changed as is known in the art, with the exception of operations necessarily occurring in a certain order. Also, description of well-known functions and constructions may be omitted for increased clarity and conciseness.

FIG. 1 illustrates an example of a wireless power transmission system.

In this described example, wireless power transmitted using the wireless power transmission system may be assumed to be a resonance power.

Referring to FIG. 1, the wireless power transmission system may have a source-target structure including a source and a target. The wireless power transmission system may include a resonance power transmitter 110 corresponding to the source and a resonance power receiver 120 corresponding to the target.

The resonance power transmitter 110 may include, for example, a source unit 111 and a source resonator 115. The source unit 111 may receive energy from an external voltage supplier to generate a resonance power. The resonance power transmitter 110 may further include a matching control 113 to perform functions such as, for example, resonance frequency or impedance matching.

The source unit 111 may include an alternating current (AC)-to-AC (AC/AC) converter, an AC-to-direct current (DC) (AC/DC) converter, and/or a DC-to-AC (DC/AC) inverter. The AC/AC converter may adjust, to a desired level, a signal level of an AC signal input from an external device. The AC/DC converter may output a DC voltage at a predetermined level by rectifying an AC signal output from the AC/AC converter. The DC/AC inverter may generate an AC signal in a band of a few megahertz (MHz) to tens of MHz by quickly switching a DC voltage output from the AC/DC converter.

The matching control 113 may set a resonance bandwidth of the source resonator 115 and/or an impedance matching frequency of the source resonator 115. Although not illustrated in FIG. 1, the matching control 113 may include a source resonance bandwidth setting unit and/or a source matching frequency setting unit. The source resonance bandwidth setting unit may set the resonance bandwidth of the source resonator 115. The source matching frequency setting unit may set the impedance matching frequency of the source resonator 115. For example, a Q-factor of the source resonator 115 may be determined based on a setting of the resonance bandwidth of the source resonator 115 or a setting of the impedance matching frequency of the source resonator 115.

The source resonator 115 may transfer electromagnetic energy to a target resonator 121. For example, the source resonator 115 may transfer the resonance power to the resonance power receiver 120 through magnetic coupling 101 with the target resonator 121. The source resonator 115 may resonate within the set resonance bandwidth.

The resonance power receiver 120 may include, for example, the target resonator 121, a matching control 123 to perform resonance frequency and/or impedance matching, and a target unit 125 to transfer the received resonance power to a load.

The target resonator 121 may receive the electromagnetic energy from the source resonator 115. The target resonator 121 may resonate within the set resonance bandwidth.

The matching control 123 may set a resonance bandwidth of the target resonator 121 and/or an impedance matching frequency of the target resonator 121. Although not illustrated in FIG. 1, the matching control 123 may include a target resonance bandwidth setting unit and/or a target matching frequency setting unit. The target resonance bandwidth setting unit may set the resonance bandwidth of the target resonator 121. The target matching frequency setting unit may set the impedance matching frequency of the target resonator 121. Here, a Q-factor of the target resonator 121 may be determined based on a setting of the resonance bandwidth of the target resonator 121 or a setting of the impedance matching frequency of the target resonator 121.

The target unit 125 may transfer the received resonance power to the load. The target unit 125 may include, for example, an AC/DC converter and a DC/DC converter. The AC/DC converter may generate a DC voltage by rectifying an AC signal transmitted from the source resonator 115 to the target resonator 121. The DC/DC converter may supply a rated voltage to a device or the load by adjusting a voltage level of the DC voltage.

The source resonator 115 and the target resonator 121 may be configured, for example, in a helix coil structured resonator, a spiral coil structured resonator, a meta-structured resonator, and the like.

Referring to FIG. 1, a process of controlling the Q-factor may include setting the resonance bandwidth of the source resonator 115 and the resonance bandwidth of the target resonator 121, and transferring the electromagnetic energy from the source resonator 115 to the target resonator 121 through magnetic coupling 101 between the source resonator 115 and the target resonator 121. The resonance bandwidth of the source resonator 115 may be set to be wider or narrower than the resonance bandwidth of the target resonator 121. For example, an unbalanced relationship between a BW-factor of the source resonator 115 and a BW-factor of the target resonator 121 may be maintained by setting the resonance bandwidth of the source resonator 115 to be wider or narrower than the resonance bandwidth of the target resonator 121.

In a wireless power transmission employing a resonance scheme, the resonance bandwidth may be an important factor. In an example in which the Q-factor, considering a change in a distance between the source resonator 115 and the target resonator 121, a change in the resonance impedance, impedance mismatching, a reflected signal, and the like, is represented by the value Qt, Qt may have an inverse-proportional relationship with the resonance bandwidth, as given by Equation 1.

$$\frac{\Delta f}{f_0} = \frac{1}{Qt}$$

$$= \Gamma_{S,D} + \frac{1}{BW_S} + \frac{1}{BW_D}$$

[Equation 1]

In Equation 1, $f_0$ denotes a central frequency, $\Delta f$ denotes a change in a bandwidth, $\Gamma_{S,D}$ denotes a reflection loss between the source resonator 115 and the target resonator 121, $BW_S$ denotes the resonance bandwidth of the source resonator 115, and $BW_D$ denotes the resonance bandwidth of the target resonator 121. In the presently described example, the BW-factor may indicate either $1/BW_S$ or $1/BW_D$.

Due to an external effect, for example, a change in the distance between the source resonator 115 and the target resonator 121, a change in a location of the source resonator 115 and/or the target resonator 121, and/or other like changes, impedance mismatching between the source resonator 115 and the target resonator 121 may occur. The impedance mismatching may be a direct cause in decreasing an efficiency of power transfer. In an example in which a reflected wave corresponding to a transmission signal that is partially reflected and returned is detected, the matching control 113 may determine that impedance mismatching has occurred, and may perform impedance matching. For example, the matching control 113 may change a resonance frequency by detecting a resonance point through a waveform analysis of the reflected wave. The matching control 113 may determine, as the resonance frequency, a frequency having a minimum amplitude in the waveform of the reflected wave.

Figure 2:
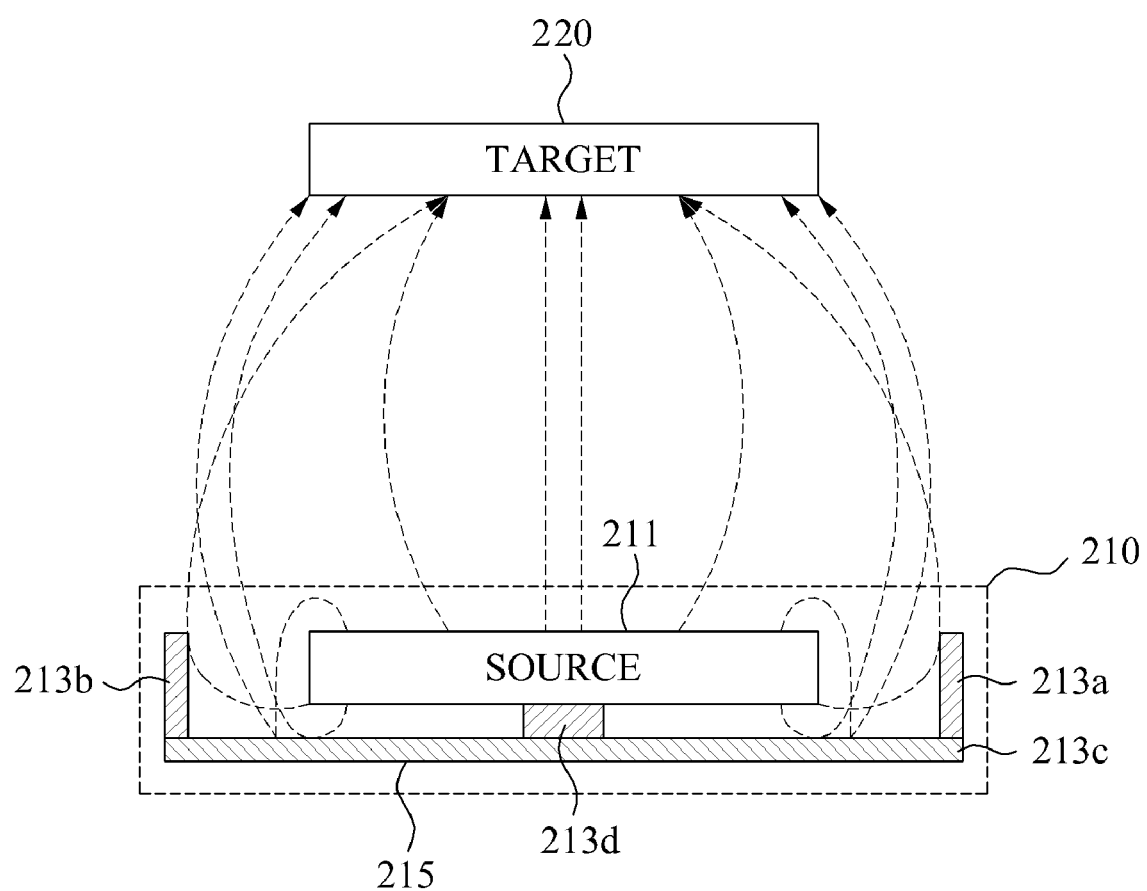
FIG. 2 is a diagram illustrating an example of a wireless power transmission apparatus.

FIG. 2 illustrates a wireless power transmission apparatus 210.

Figure 5:
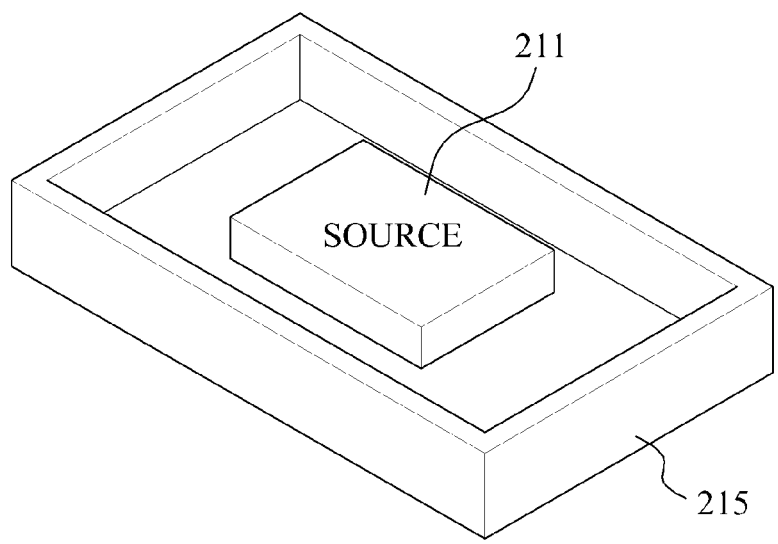
FIG. 5 is a side diagram illustrating the wireless power transmission apparatus of FIG. 2.

Referring to FIG. 2, the wireless power transmission apparatus 210 may include a source unit 211, and a near field controller 215. An alternate view of portions of the wireless power transmission apparatus 210 is illustrated in FIG. 5.

The source unit 211 may include a power resonator to transmit a wireless power to a target apparatus 220. The source unit 211 may further include a measuring unit to measure a location or a direction of the target apparatus 220. For example, the measuring unit may be a communication module configured to receive location information via a communication channel with the target apparatus 220. As another example, the measuring unit may detect a direction that is set in advance for each target apparatus 220.

The near field controller 215 may control a direction of a magnetic field of the power resonator. More particulalry, the near field controller 215 may control a direction of a magnetic field generated by a near field of the source unit 211 to be focused on the target apparatus 220. Referring to FIG. 2, the magnetic field may be generated in all directions indicated by dotted arrows in the near field of the source unit 211, and may be focused on the target apparatus 220 by the near field controller 215.

The near field controller 215 may be designed to have a High Impedance Surface (HIS) characteristic. Thus, the near field controller 215 may minimize a change in a resonance frequency or a Q-factor of the power resonator by minimizing a ground effect.

For example, the HIS characteristic may be designed based on a resonance frequency of the source unit 211. In other words, the near field controller 215 may be designed so that the magnetic field of the source unit 211 may have an in-phase characteristic. In a case in which the near field controller 215 has the HIS characteristic, the magnetic field generated by the source unit 211 may have the in-phase characteristic with respect to the near field controller 215. Thus, it is possible to minimize an influence on peripheral apparatuses that are sensitive to the magnetic field.

The near field controller 215 may include side focusing units 213a and 213b, a rear surface focusing unit 213c, and a direction adjusting unit 213d, as illustrated in FIG. 2.

The side focusing units 213a and 213b may control a direction of a side magnetic field of the source unit 211, so that the side magnetic field of the source unit 211 may be focused on the target apparatus 220, as illustrated in FIG. 2. In other words, the side magnetic field which is directed outward from the side of the source unit 211 may be controlled by the side focusing units 213a and 213b so that it is directed toward the target 220.

The rear surface focusing unit 213c may control a direction of a rear surface magnetic field of the source unit 211, so that the rear surface magnetic field of the source unit 211 may be focused on the target apparatus 220, as illustrated in FIG. 2.

Figure 3:
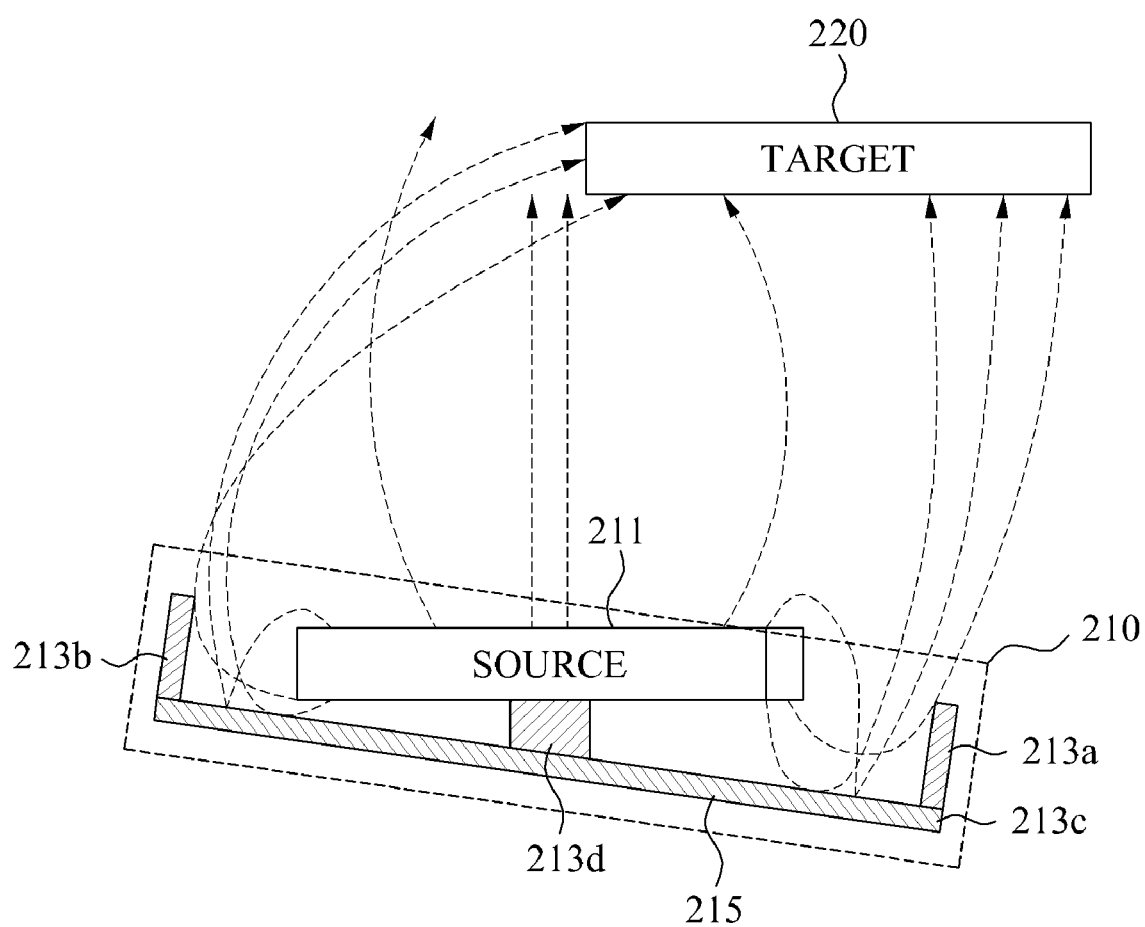
FIG. 3 is a diagram illustrating an example in which directions of side focusing units and a direction of a rear surface focusing unit are adjusted based on a direction of a target apparatus.

The direction adjusting unit 213d may adjust directions of the side focusing units 213a and 213b and a direction of the rear surface focusing unit 213c, under a control of the source unit 211 or the near field controller 215. FIG. 3 illustrates an example in which the directions of the side focusing units 213a and 213b and the direction of the rear surface focusing unit 213c are adjusted based on the direction of the target apparatus 220. In this example, the direction adjusting unit 213d may receive information regarding the direction of the target apparatus 220 from the measuring unit which measures the location or the direction of the target apparatus 220. The measuring unit may be included in the source unit 211.

Figure 4:
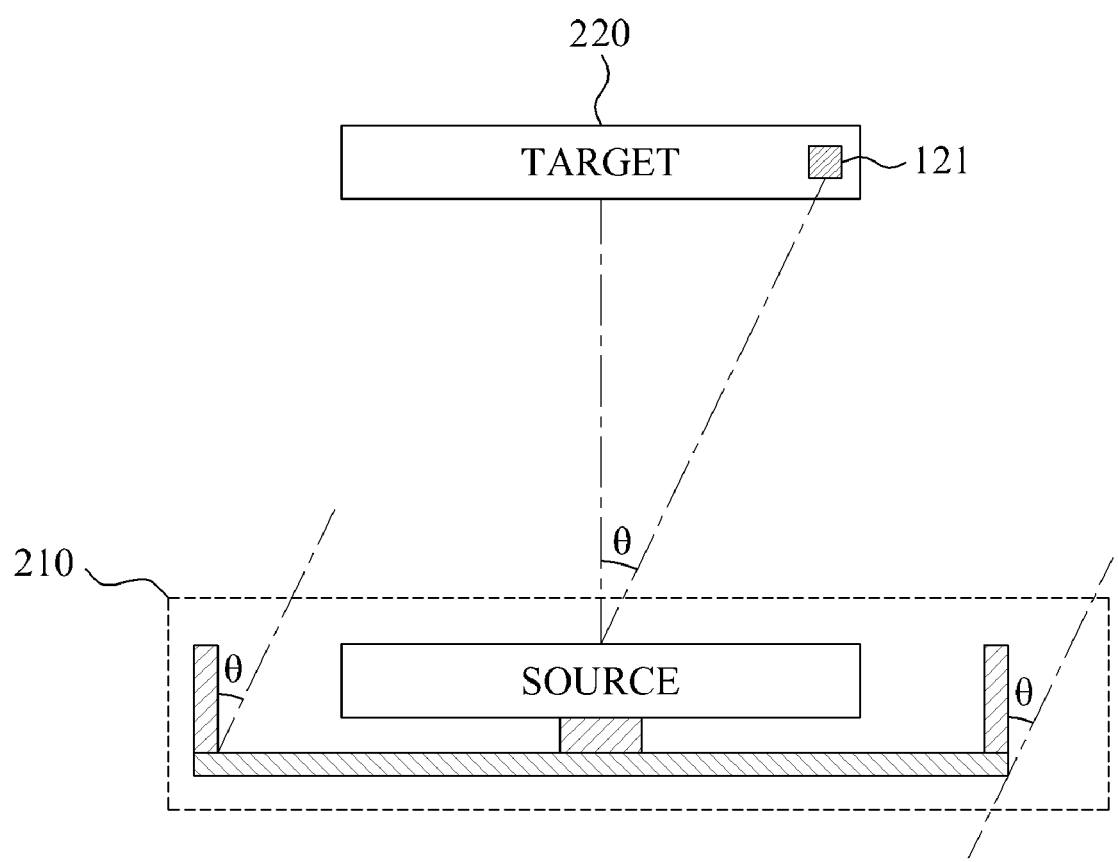
FIG. 4 is a diagram illustrating an example of controlling a focusing direction based on a location of a target resonator included in a target apparatus.

Thus, the near field controller 215 may control the direction of the magnetic field of the source unit 211 based on the location of the target apparatus 220. Additionally, the near field controller 215 may control the direction adjusting unit 213d based on a location of the target resonator 121 included in the resonance power receiver 120. FIG. 4 illustrates an example of controlling a focusing direction based on the location of the target resonator 121 included in the resonance power receiver 120. As illustrated in FIG. 4, in a case in which the target resonator 121 is placed in a right side that is inclined from a vertical direction of the source unit 211 by an angle θ, the near field controller 215 may control the direction adjusting unit 213d to adjust the focusing direction toward the right side by the angle θ.

A source resonator and/or a target resonator may be configured as, for example, a helix coil structured resonator, a spiral coil structured resonator, a meta-structured resonator, and the like.

Hereinafter, related terms will be described for concise understanding. All the materials may have a unique magnetic permeability, that is, Mu, and a unique permittivity, that is, epsilon. The magnetic permeability indicates a ratio between a magnetic flux density occurring with respect to a predetermined magnetic field in a corresponding material and a magnetic flux density occurring with respect to the predetermined magnetic field in a vacuum state. The magnetic permeability and the permittivity may determine a propagation constant of a corresponding material in a predetermined frequency or a predetermined wavelength. An electromagnetic characteristic of the corresponding material may be determined based on the magnetic permeability and the permittivity. More particularly, a material having a magnetic permeability or a permittivity not found in nature and being artificially designed is referred to as a metamaterial. The metamaterial may be easily disposed in a resonance state even in a relatively large wavelength area or a relatively low frequency area. For example, even though a material size rarely varies, the metamaterial may be easily disposed in the resonance state.

Figure 6:
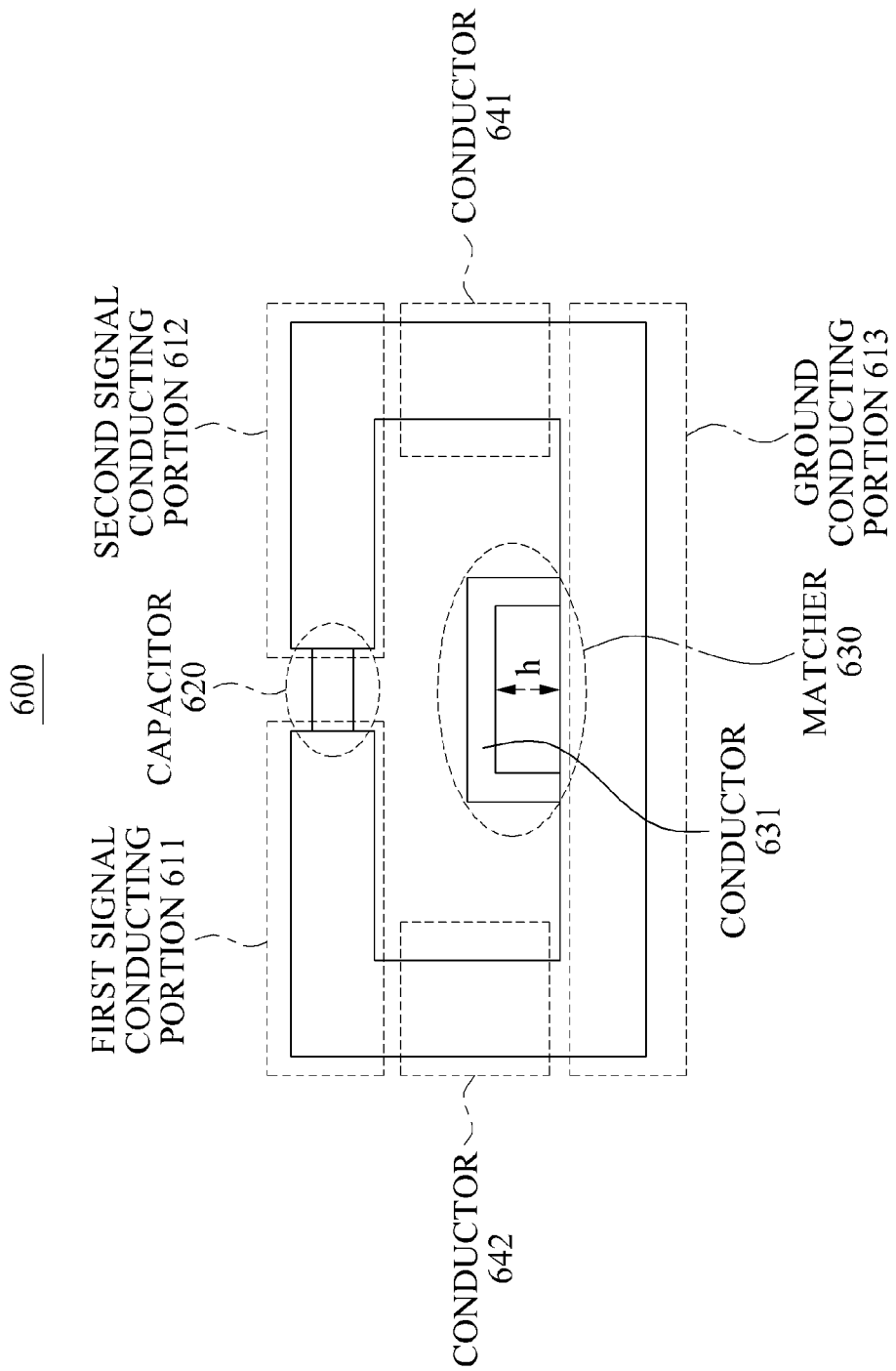
FIG. 6 is a two-dimensional (2D) illustration of an example of a resonator structure.

FIG. 6 is a two-dimensional (2D) illustration of an example of a resonator 600 structure.

Referring to FIG. 6, the resonator 600 may include a transmission line, a capacitor 620, a matcher 630, and conductors 641 and 642. The transmission line may include a first signal conducting portion 611, a second signal conducting portion 612, and a ground conducting portion 613.

The capacitor 620 may be inserted in series between the first signal conducting portion 611 and the second signal conducting portion 612, whereby an electric field may be confined within the capacitor 620. Generally, the transmission line may include at least one conductor in an upper portion of the transmission line, and may also include at least one conductor in a lower portion of the transmission line. A current may flow through the at least one conductor disposed in the upper portion of the transmission line and the at least one conductor disposed in the lower portion of the transmission may be electrically grounded. Herein, a conductor disposed in an upper portion of the transmission line may be separated and thereby referred to as the first signal conducting portion 611 and the second signal conducting portion 612. A conductor disposed in the lower portion of the transmission line may be referred to as the ground conducting portion 613.

As illustrated in FIG. 6, the transmission line may include the first signal conducting portion 611 and the second signal conducting portion 612 in the upper portion of the transmission line, and may include the ground conducting portion 613 in the lower portion of the transmission line. The first signal conducting portion 611 and the second signal conducting portion 612 may be disposed to face the ground conducting portion 613. The current may flow through the first signal conducting portion 611 and the second signal conducting portion 612.

One end of the first signal conducting portion 611 may be shorted to the conductor 642, and another end of the first signal conducting portion 611 may be connected to the capacitor 620. One end of the second signal conducting portion 612 may be grounded to the conductor 641, and another end of the second signal conducting portion 612 may be connected to the capacitor 620. Accordingly, the first signal conducting portion 611, the second signal conducting portion 612, the ground conducting portion 613, and the conductors 641 and 642 may be connected to each other, whereby the resonator 600 may have an electrically closed-loop structure. The term "loop structure" may include a polygonal structure, for example, a circular structure, a rectangular structure, and the like. "Having a loop structure" may indicate being electrically closed.

The capacitor 620 may be inserted into an intermediate portion of the transmission line. For example, the capacitor 620 may be inserted into a space between the first signal conducting portion 611 and the second signal conducting portion 612. The capacitor 620 may have a shape of a lumped element, a distributed element, and the like. For example, a distributed capacitor having the shape of the distributed element may include zigzagged conductor lines and a dielectric material having a relatively high permittivity between the zigzagged conductor lines.

In an example in which the capacitor 620 is inserted into the transmission line, the resonator 600 may have a property of a metamaterial. The metamaterial indicates a material having a predetermined electrical property that cannot be discovered in nature, and thus may have an artificially designed structure. An electromagnetic characteristic of materials existing in nature may have a unique magnetic permeability or a unique permittivity. Most materials may have a positive magnetic permeability or a positive permittivity. In the case of most materials, a right hand rule may be applied to an electric field, a magnetic field, and a pointing vector, and thus the corresponding materials may be referred to as right handed materials (RHMs). However, the metamaterial has a magnetic permeability or a permittivity absent in nature, and thus may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

In an example in which a capacitance of the capacitor 620 inserted as the lumped element is appropriately determined, the resonator 600 may have the characteristic of the metamaterial. Since the resonator 600 may have a negative magnetic permeability by appropriately adjusting the capacitance of the capacitor 620, the resonator 600 may also be referred to as an MNG resonator. Various criteria may be applied to determine the capacitance of the capacitor 620. For example, the various criteria may include a criterion to enable the resonator 600 to have the characteristic of the metamaterial, a criterion to enable the resonator 600 to have a negative magnetic permeability in a target frequency, a criterion to enable the resonator 600 to have a zeroth order resonance characteristic in the target frequency, and the like. Based on at least one criterion among the aforementioned criteria, the capacitance of the capacitor 620 may be determined.

The resonator 600, also referred to as the MNG resonator 600, may have a zeroth order resonance characteristic of having, as a resonance frequency, a frequency when a propagation constant is "0". Since the resonator 600 may have the zeroth order resonance characteristic, the resonance frequency may be independent with respect to a physical size of the MNG resonator 600. By appropriately designing the capacitor 620, the MNG resonator 600 may sufficiently change the resonance frequency. Accordingly, the physical size of the MNG resonator 600 may not need to be changed in order to change the resonance frequency.

In a near field, the electric field may be concentrated on the capacitor 620 inserted into the transmission line. Accordingly, due to the capacitor 620, the magnetic field may become dominant in the near field. The MNG resonator 600 may have a relatively high Q-factor using the capacitor 620 of the lumped element and thus, it is possible to enhance an efficiency of power transmission. In such an example, the Q-factor indicates a level of an ohmic loss or a ratio of a reactance with respect to a resistance in the wireless power transmission. It can be understood that the efficiency of the wireless power transmission may increase according to an increase in the Q-factor.

The MNG resonator 600 may include the matcher 630 to be used in impedance matching. The matcher 630 may appropriately adjust a strength of a magnetic field of the MNG resonator 600. An impedance of the MNG resonator 600 may be determined by the matcher 630. A current may flow in the MNG resonator 600 via a connector, or may flow out from the MNG resonator 600 via the connector. The connector may be connected to the ground conducting portion 613 or the matcher 630. The power may be transferred through coupling without using a physical connection between the connector and the ground conducting portion 613 or the matcher 630.

More specifically, as illustrated in FIG. 6, the matcher 630 may be positioned within the loop formed by the loop structure of the resonator 600. The matcher 630 may adjust the impedance of the resonator 600 by changing the physical shape of the matcher 630. For example, the matcher 630 may include the conductor 631 to be used in the impedance matching in a location separate from the ground conducting portion 613 by a distance h. The impedance of the resonator 600 may be changed by adjusting the distance h.

Although not illustrated in FIG. 6, a controller may be provided to control the matcher 630. In this example, the matcher 630 may change the physical shape of the matcher 630 based on a control signal generated by the controller. For example, the distance h between the conductor 631 of the matcher 630 and the ground conducting portion 613 may be increased or decreased based on the control signal. Accordingly, the physical shape of the matcher 630 may be changed whereby the impedance of the resonator 600 may be adjusted. The controller may generate the control signal based on various factors, which will be described later.

As illustrated in FIG. 6, the matcher 630 may be configured as a passive element such as the conductor 631. Depending on various example embodiments, the matcher 630 may be configured as an active element such as a diode, a transistor, and the like. In an example in which the active element is included in the matcher 630, the active element may be driven based on the control signal generated by the controller, and the impedance of the resonator 600 may be adjusted based on the control signal. For example, a diode that is a type of the active element may be included in the matcher 630. The impedance of the resonator 600 may be adjusted depending on whether the diode is in an on state or in an off state.

Although not illustrated in FIG. 6, a magnetic core may be further provided to pass through the MNG resonator 600. The magnetic core may perform a function of increasing a power transmission distance.

Figure 7:
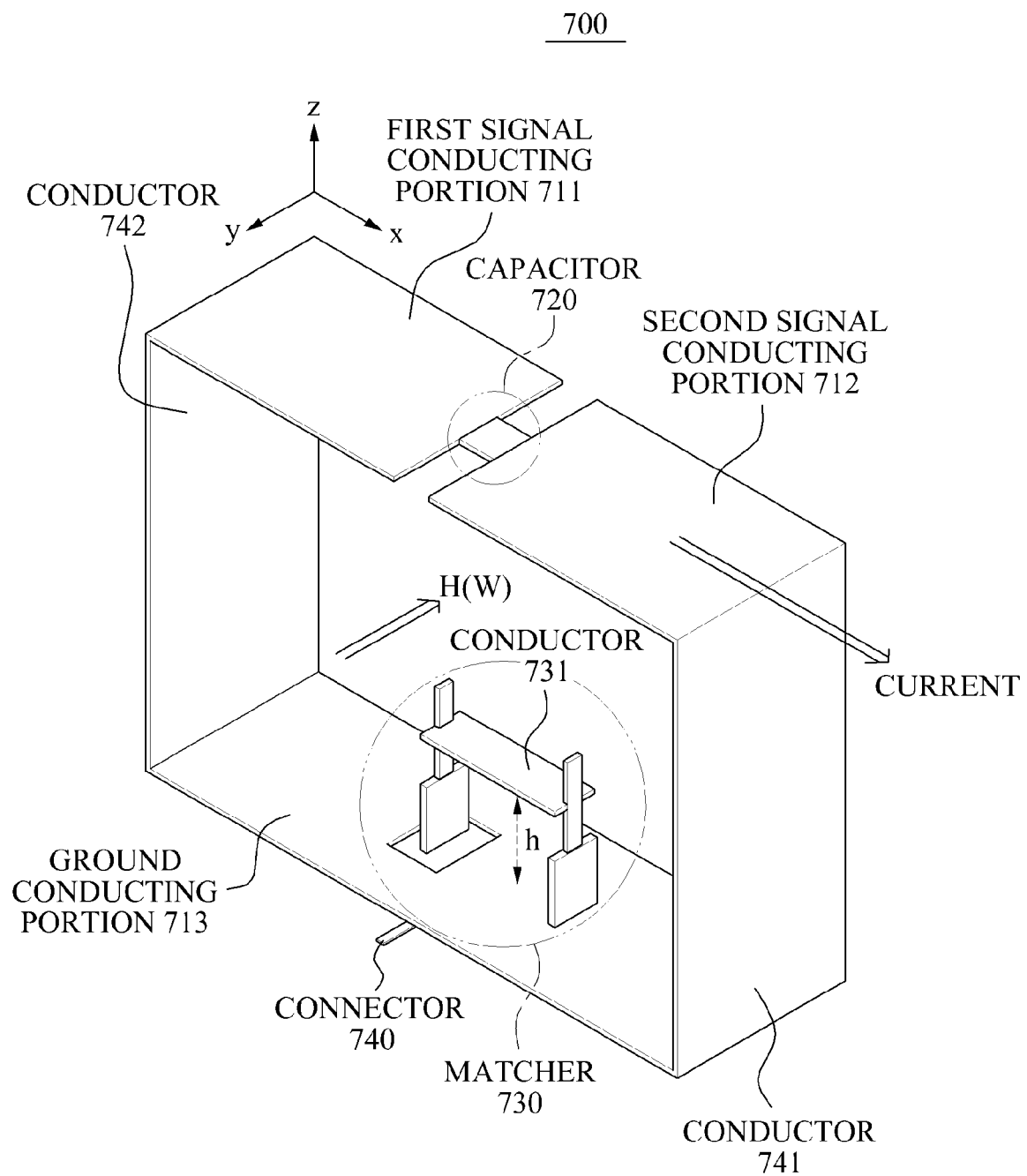
FIG. 7 is a three-dimensional illustration an example of a resonator structure.

FIG. 7 is a three-dimensional illustration an example of a resonator 700 structure.

Referring to FIG. 7, the resonator 700 may include a transmission line and a capacitor 720. The transmission line may include a first signal conducting portion 711, a second signal conducting portion 712, and a ground conducting portion 713. The capacitor 720 may be inserted in series between the first signal conducting portion 711 and the second signal conducting portion 712 of the transmission link, whereby an electric field may be confined within the capacitor 720.

As illustrated in FIG. 7, the transmission line may include the first signal conducting portion 711 and the second signal conducting portion 712 in an upper portion of the resonator 700, and may include the ground conducting portion 713 in a lower portion of the resonator 700. The first signal conducting portion 711 and the second signal conducting portion 712 may be disposed to face the ground conducting portion 713. A current may flow in an x direction through the first signal conducting portion 711 and the second signal conducting portion 712. Due to the current, a magnetic field H(W) may be formed in a −y direction. Alternatively, unlike the diagram of FIG. 7, the magnetic field H(W) may be formed in a +y direction.

One end of the first signal conducting portion 711 may be shorted to the conductor 742, and another end of the first signal conducting portion 711 may be connected to the capacitor 720. One end of the second signal conducting portion 712 may be grounded to the conductor 741, and another end of the second signal conducting portion 712 may be connected to the capacitor 720. Accordingly, the first signal conducting portion 711, the second signal conducting portion 712, the ground conducting portion 713, and the conductors 741 and 742 may be connected to each other, whereby the resonator 700 may have an electrically closed-loop structure. The term "loop structure" may include a polygonal structure, for example, a circular structure, a rectangular structure, and the like. "Having a loop structure" may indicate being electrically closed.

As illustrated in FIG. 7, the capacitor 720 may be inserted between the first signal conducting portion 711 and the second signal conducting portion 712. The capacitor 720 may be inserted into a space between the first signal conducting portion 711 and the second signal conducting portion 712. The capacitor 720 may have a shape of a lumped element, a distributed element, and the like. For example, a distributed capacitor having the shape of the distributed element may include zigzagged conductor lines and a dielectric material having a relatively high permittivity between the zigzagged conductor lines.

As the capacitor 720 is inserted into the transmission line, the resonator 700 may have a property of a metamaterial.

In a case in which a capacitance of the capacitor inserted as the lumped element is appropriately determined, the resonator 700 may have the characteristic of the metamaterial. Since the resonator 700 may have a negative magnetic permeability by appropriately adjusting the capacitance of the capacitor 720, the resonator 700 may also be referred to as an MNG resonator. Various criteria may be applied to determine the capacitance of the capacitor 720. For example, the various criteria may include a criterion to enable the resonator 700 to have the characteristic of the metamaterial, a criterion to enable the resonator 700 to have a negative magnetic permeability in a target frequency, a criterion to enable the resonator 700 to have a zeroth order resonance characteristic in the target frequency, and the like. Based on at least one criterion among the aforementioned criteria, the capacitance of the capacitor 720 may be determined.

The resonator 700, also referred to as the MNG resonator 700, may have a zeroth order resonance characteristic of having, as a resonance frequency, a frequency when a propagation constant is "0". Since the resonator 700 may have the zeroth order resonance characteristic, the resonance frequency may be independent with respect to a physical size of the MNG resonator 700. By appropriately designing the capacitor 720, the MNG resonator 700 may sufficiently change the resonance frequency. Accordingly, the physical size of the MNG resonator 700 may not be changed.

Referring to the MNG resonator 700 of FIG. 7, in a near field, the electric field may be concentrated on the capacitor 720 inserted into the transmission line. Accordingly, due to the capacitor 720, the magnetic field may become dominant in the near field. More particularly, since the MNG resonator 700 having the zeroth-order resonance characteristic may have characteristics similar to a magnetic dipole, the magnetic field may become dominant in the near field. A relatively small amount of the electric field formed due to the insertion of the capacitor 720 may be concentrated on the capacitor 720 and thus, the magnetic field may become further dominant.

Also, the MNG resonator 700 may include the matcher 730 to be used in impedance matching. The matcher 730 may appropriately adjust the strength of magnetic field of the MNG resonator 700. An impedance of the MNG resonator 700 may be determined by the matcher 730. A current may flow in the MNG resonator 700 via a connector 740, or may flow out from the MNG resonator 700 via the connector 740. The connector 740 may be connected to the ground conducting portion 713 or the matcher 730.

More specifically, as illustrated in FIG. 7, the matcher 730 may be positioned within the loop formed by the loop structure of the resonator 700. The matcher 730 may adjust the impedance of the resonator 700 by changing the physical shape of the matcher 730. For example, the matcher 730 may include the conductor 731 to be used in the impedance matching in a location separate from the ground conducting portion 713 by a distance h. The impedance of the resonator 700 may be changed by adjusting the distance h.

Although not illustrated in FIG. 7, a controller may be provided to control the matcher 730. In this case, the matcher 730 may change the physical shape of the matcher 730 based on a control signal generated by the controller. For example, the distance h between the conductor 731 of the matcher 730 and the ground conducting portion 713 may be increased or decreased based on the control signal. Accordingly, the physical shape of the matcher 730 may be changed whereby the impedance of the resonator 700 may be adjusted. The distance h between the conductor 731 of the matcher 730 and the ground conducting portion 713 may be adjusted using a variety of schemes. As one example, a plurality of conductors may be included in the matcher 730 and the distance h may be adjusted by adaptively activating one of the conductors. As another example, the distance h may be adjusted by adjusting the physical location of the conductor 731 up and down. The distance h may be controlled based on the control signal of the controller. The controller may generate the control signal using various factors. An example of such a controller generating the control signal will be described later.

As illustrated in FIG. 7, the matcher 730 may be configured as a passive element such as the conductor 731. According to various example embodiments, the matcher 730 may be configured as an active element such as a diode, a transistor, and the like. In an example in which the active element is included in the matcher 730, the active element may be driven based on the control signal generated by the controller, and the impedance of the resonator 700 may be adjusted based on the control signal. For example, a diode that is a type of the active element may be included in the matcher 730. The impedance of the resonator 700 may be adjusted depending on whether the diode is in an on state or in an off state.

Although not illustrated in FIG. 7, a magnetic core may be further provided to pass through the resonator 700 configured as the MNG resonator. The magnetic core may perform a function of increasing a power transmission distance.

Figure 8:
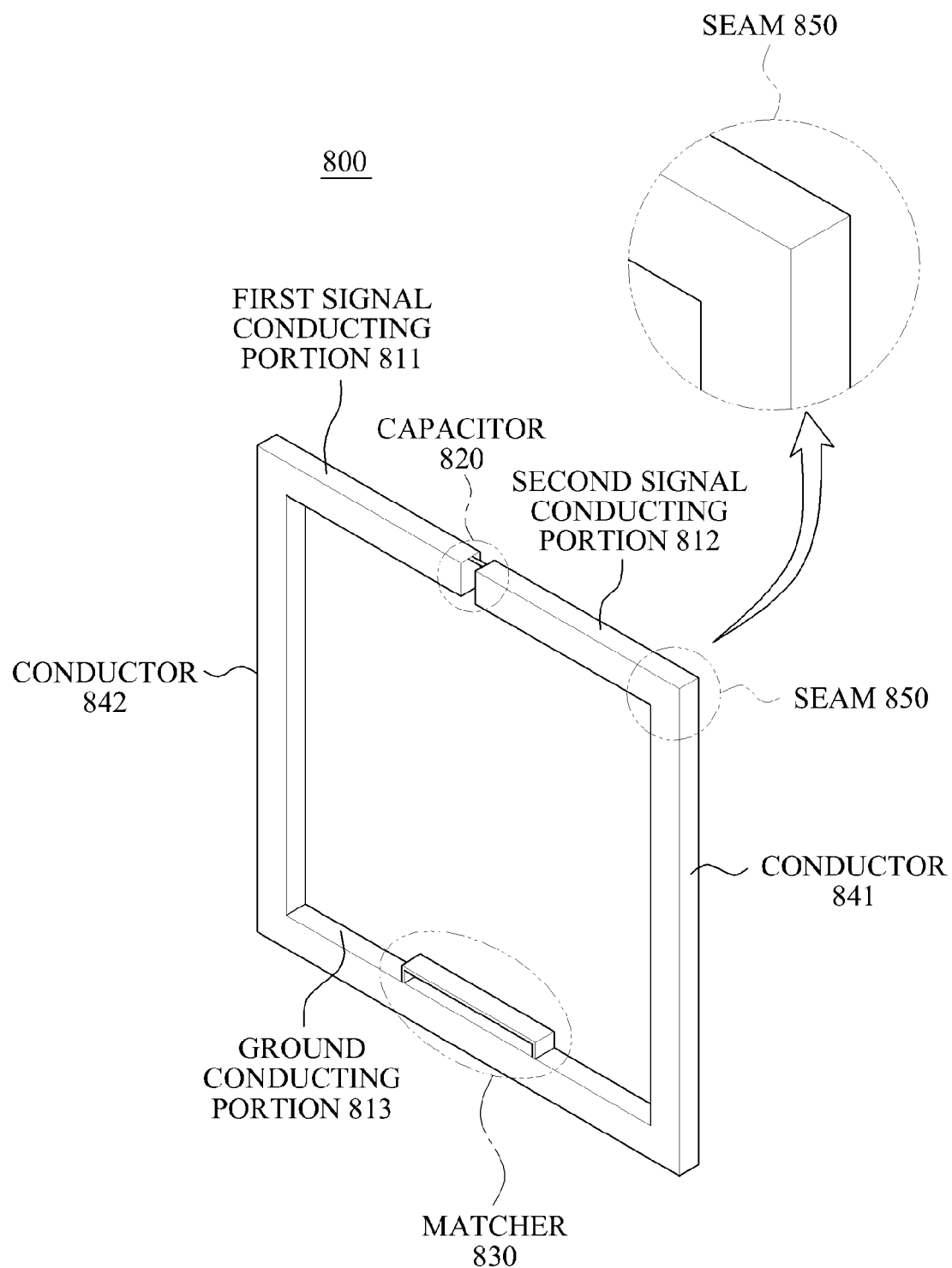
FIG. 8 illustrates an example of a resonator for a wireless power transmission configured as a bulky type.

FIG. 8 illustrates an example of a resonator 800 for a wireless power transmission configured as a bulky type.

Referring to FIG. 8, a first signal conducting portion 811 and a conductor 842 may be integrally formed, rather than being separately manufactured, and thereby may be connected to each other. Similarly, a second signal conducting portion 812 and a conductor 841 may also be integrally manufactured.

In an example in which the second signal conducting portion 812 and the conductor 841 are separately manufactured and then are connected to each other, a loss of conduction may occur due to a seam 850. The second signal conducting portion 812 and the conductor 841 may be connected to each other without using a separate seam, that is, may be seamlessly connected to each other. Accordingly, it is possible to decrease a conductor loss caused by the seam 850. Accordingly, the second signal conducting portion 812 and a ground conducting portion 813 may be seamlessly and integrally manufactured. Similarly, the first signal conducting portion 811 and the ground conducting portion 813 may be seamlessly and integrally manufactured.

Referring to FIG. 8, a type of a seamless connection connecting at least two partitions into an integrated form is referred to as a bulky type.

Figure 9:
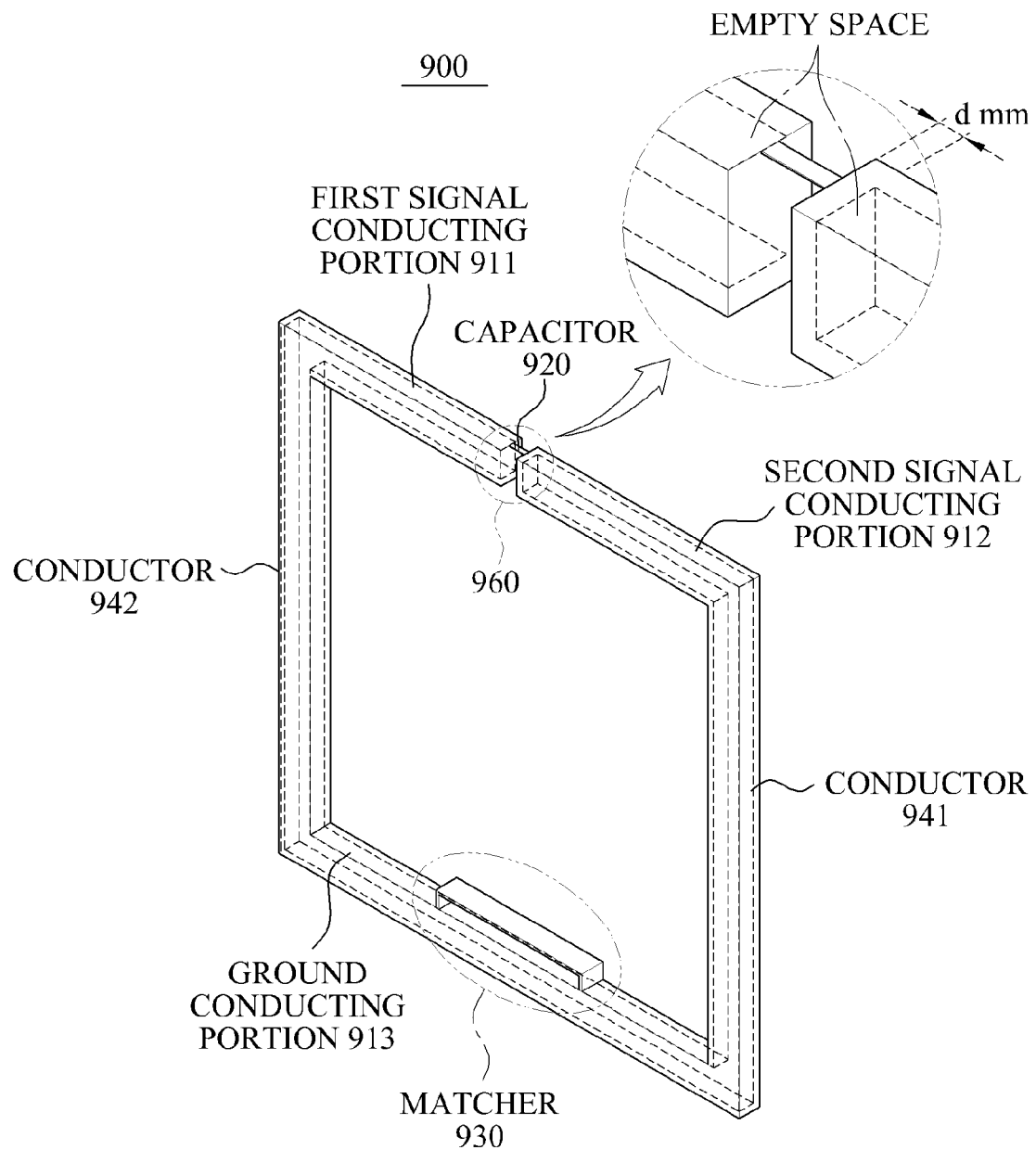
FIG. 9 illustrates an example of a resonator for a wireless power transmission, configured as a hollow type.

FIG. 9 illustrates an example of a resonator 900 for a wireless power transmission, configured as a hollow type.

Referring to FIG. 9, each of a first signal conducting portion 911, a second signal conducting portion 912, a ground conducting portion 913, and conductors 941 and 942 of the resonator 900 configured as the hollow type may include an empty space inside.

In a predetermined resonance frequency, an active current may be modeled to flow in only a portion of the first signal conducting portion 911 instead of all of the first signal conducting portion 911, a portion of the second signal conducting portion 912 instead of all of the second signal conducting portion 912, a portion of the ground conducting portion 913 instead of all of the ground conducting portion 913, and portions of the conductors 941 and 942 instead of all of the conductors 941 and 942. More specifically, in an example in which a depth of each of the first signal conducting portion 911, the second signal conducting portion 912, the ground conducting portion 913, and the conductors 941 and 942 is significantly deeper than a corresponding skin depth in the predetermined resonance frequency, such a structure may be ineffective. The significantly deeper depth may increase a weight or manufacturing costs of the resonator 900.

Accordingly, in the predetermined resonance frequency, the depth of each of the first signal conducting portion 911, the second signal conducting portion 912, the ground conducting portion 913, and the conductors 941 and 942 may be appropriately determined based on the corresponding skin depth of each of the first signal conducting portion 911, the second signal conducting portion 912, the ground conducting portion 913, and the conductors 941 and 942. In an example in which each of the first signal conducting portion 911, the second signal conducting portion 912, the ground conducting portion 913, and the conductors 941 and 942 has an appropriate depth deeper than a corresponding skin depth, the resonator 900 may be manufactured to be lighter, and manufacturing costs of the resonator 900 may also decrease.

For example, as illustrated in FIG. 9, the depth of the second signal conducting portion 912 may be determined as "d" mm and d may be determined according to $$d = \frac{1}{\sqrt{\pi f \mu \sigma}}.$$

Here, f denotes a frequency, $\mu$ denotes a magnetic permeability, $\sigma$ and denotes a conductor constant. In an example in which the first signal conducting portion 911, the second signal conducting portion 912, the ground conducting portion 913, and the conductors 941 and 942 are made of a copper and have a conductivity of $5.8 \times 10^7$ siemens per meter ($S \cdot m^{-1}$), the skin depth may be about 0.6 mm with respect to 10 kHz of the resonance frequency, and the skin depth may be about 0.006 mm with respect to 100 MHz of the resonance frequency.

Figure 10:
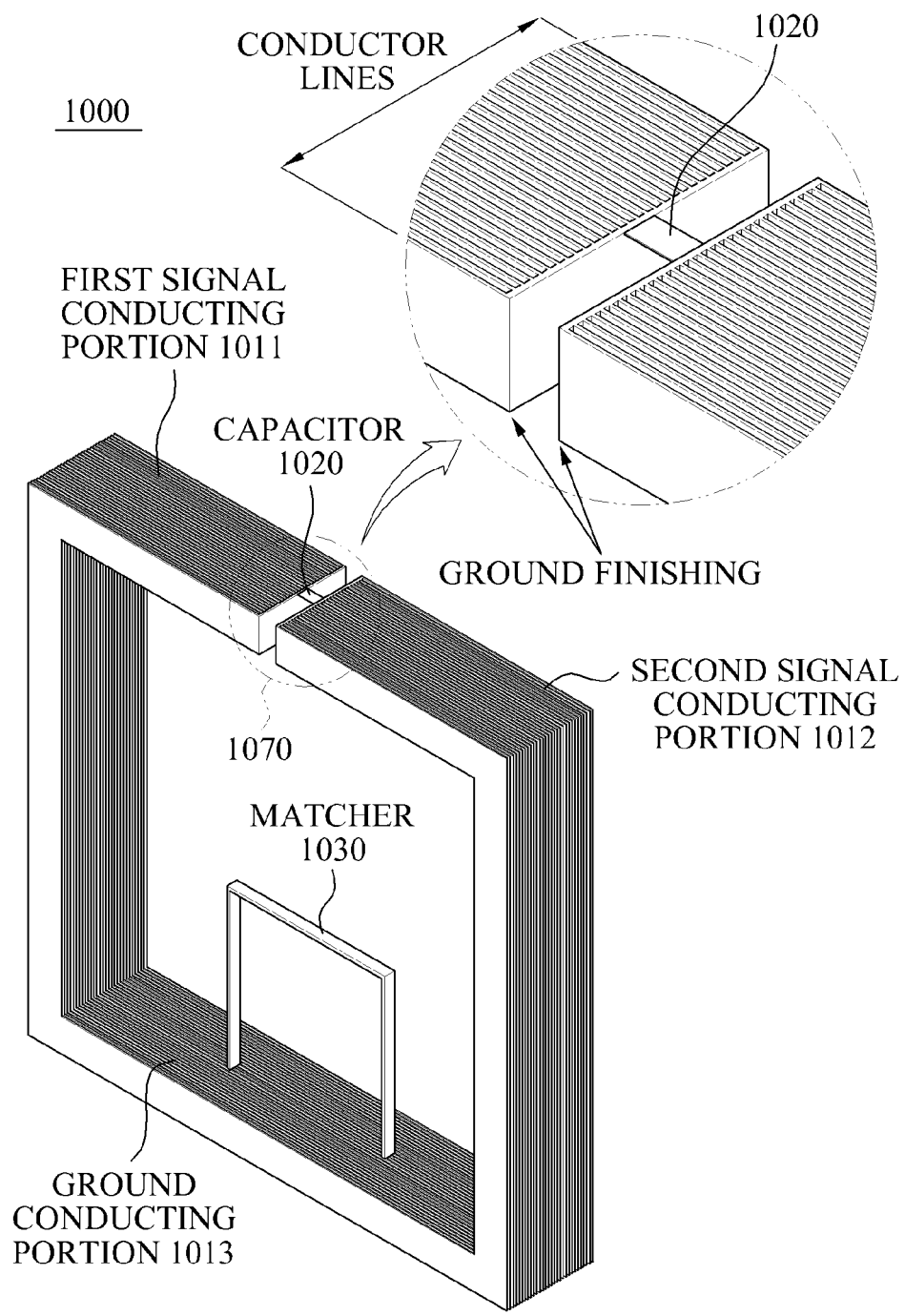
FIG. 10 illustrates an example of a resonator for a wireless power transmission using a parallel-sheet configuration.

FIG. 10 illustrates an example of a resonator 1000 for a wireless power transmission using a parallel-sheet configuration.

Referring to FIG. 10, the parallel-sheet configuration may be applicable to each of a first signal conducting portion 1011 and a second signal conducting portion 1012 included in the resonator 1000.

Each of the first signal conducting portion 1011 and the second signal conducting portion 1012 may not be a perfect conductor, and thus may have a resistance. Due to the resistance, an ohmic loss may occur. The ohmic loss may decrease a Q-factor and may also decrease a coupling effect.

By applying the parallel-sheet configuration to each of the first signal conducting portion 1011 and the second signal conducting portion 1012, it is possible to decrease the ohmic loss, and to increase the Q-factor and the coupling effect. Referring to a portion 1070 indicated by a circle in FIG. 10, in an example in which the parallel-sheet configuration is applied, each of the first signal conducting portion 1011 and the second signal conducting portion 1012 may include a plurality of conductor lines. The plurality of conductor lines may be disposed in parallel, and may be shorted at an end portion of each of the first signal conducting portion 1011 and the second signal conducting portion 1012.

As described above, in an example in which the parallel-sheet configuration is applied to each of the first signal conducting portion 1011 and the second signal conducting portion 1012, the plurality of conductor lines may be disposed in parallel. Accordingly, a sum of resistances having the conductor lines may decrease. Consequently, the resistance loss may decrease, and the Q-factor and the coupling effect may increase.

Figure 11:
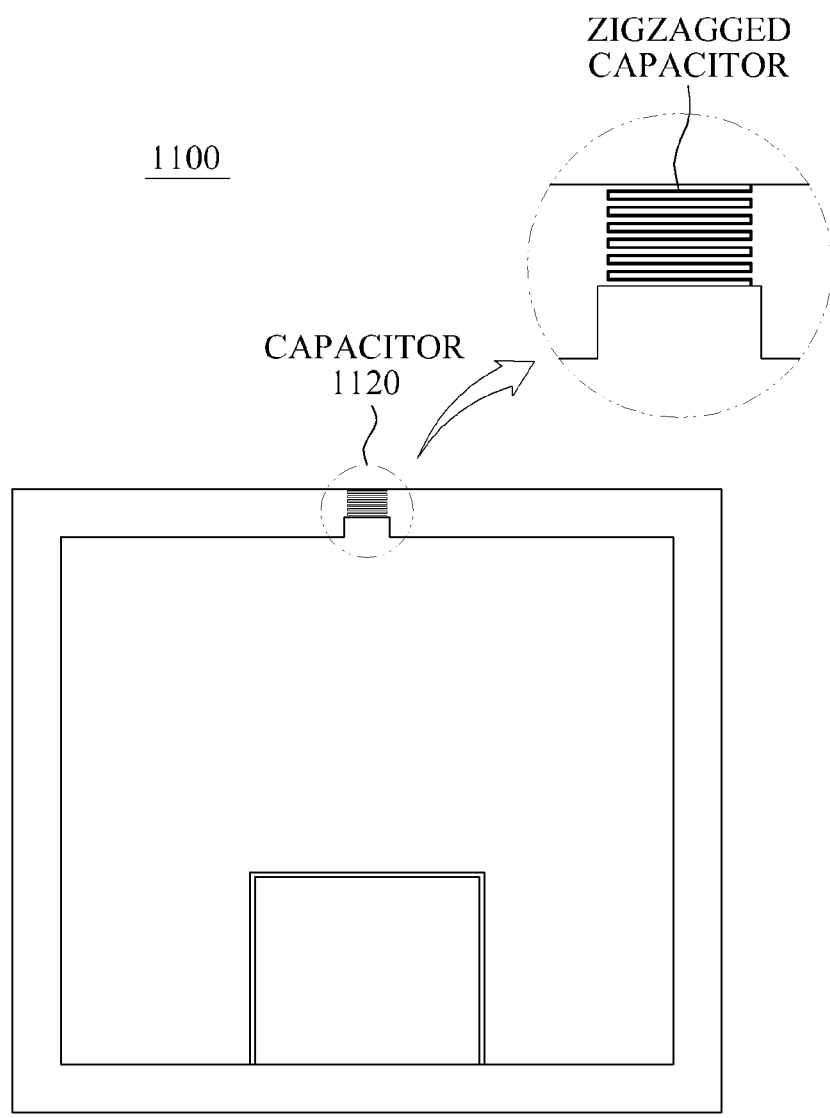
FIG. 11 illustrates an example of a resonator for a wireless power transmission including a distributed capacitor.

FIG. 11 illustrates an example of a resonator 1100 for a wireless power transmission including a distributed capacitor.

Referring to FIG. 11, a capacitor 1120 included in the resonator 1100 for the wireless power transmission may be a distributed capacitor. A capacitor as a lumped element may have a relatively high equivalent series resistance (ESR). A variety of schemes have been proposed to decrease the ESR contained in the capacitor of the lumped element. According to an example embodiment, by using the capacitor 1120 as a distributed element, it is possible to decrease the ESR. As is known in the art, a loss caused by the ESR may decrease a Q-factor and a coupling effect.

As illustrated in FIG. 11, the capacitor 1120 as the distributed element may have a zigzagged structure. For example, the capacitor 1120 as the distributed element may be configured as a conductive line and a conductor having the zigzagged structure.

As illustrated in FIG. 11, by employing the capacitor 1120 as the distributed element, it is possible to decrease the loss occurring due to the ESR. In addition, by disposing a plurality of capacitors as lumped elements, it is possible to decrease the loss occurring due to the ESR. Since a resistance of each of the capacitors as the lumped elements decreases through a parallel connection, active resistances of parallel-connected capacitors as the lumped elements may also decrease, whereby the loss occurring due to the ESR may decrease. For example, by employing ten capacitors of 1 pF instead of using a single capacitor of 10 pF, it is possible to decrease the loss occurring due to the ESR.

Figure 12A:
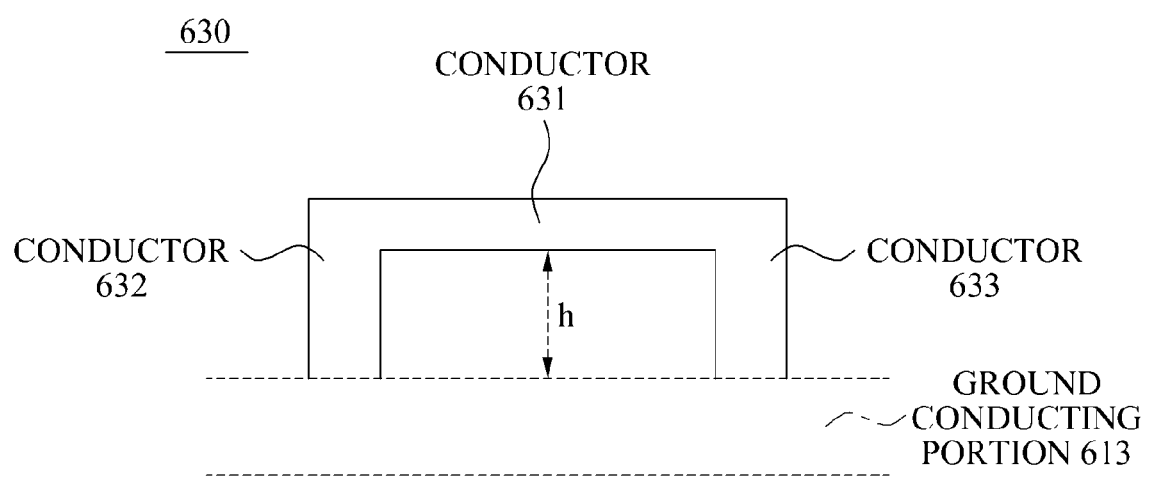
FIG. 12A illustrates an example of the matcher used in the resonator of FIG. 6.
Figure 12B:
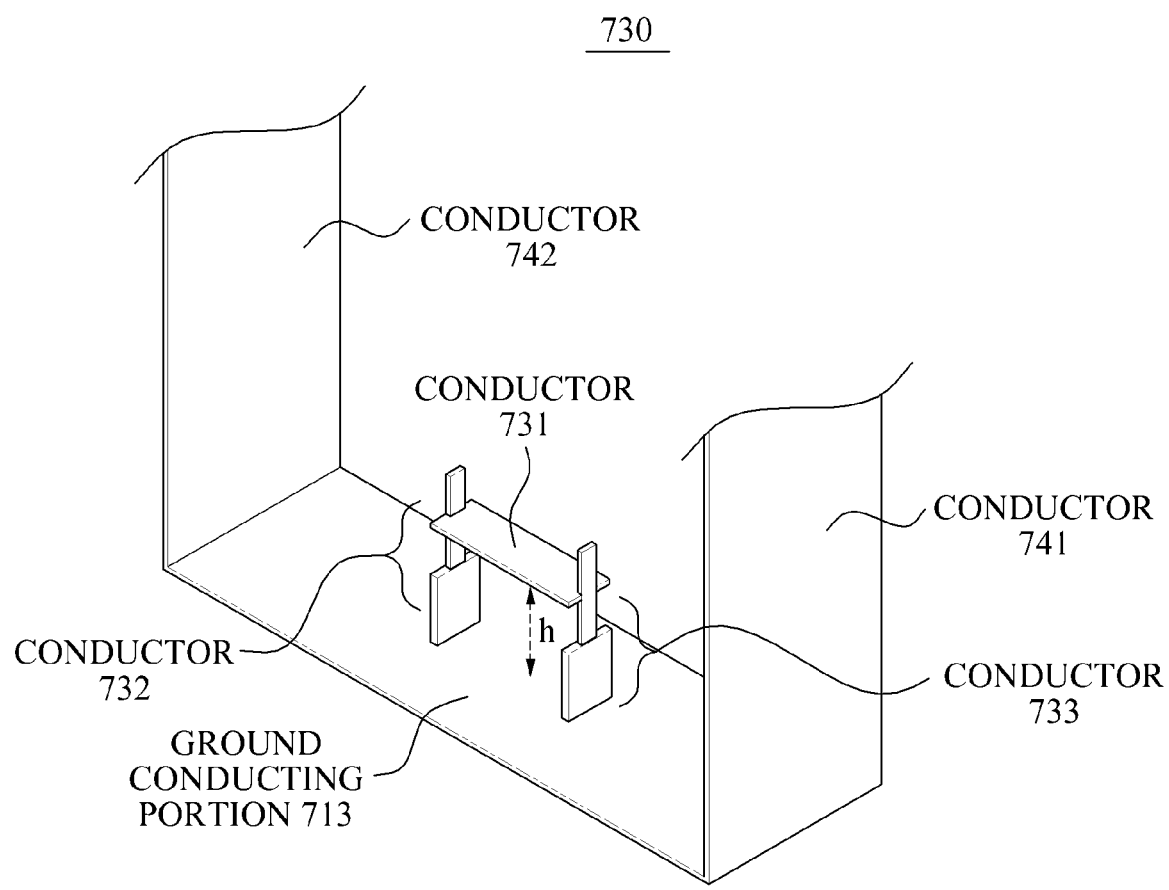
FIG. 12B illustrates an example of the matcher used in the resonator of FIG. 7.

FIG. 12A illustrates an example of the matcher 630 used in the resonator 600 illustrated in FIG. 6, and FIG. 12B illustrates an example of the matcher 730 used in the resonator 700 illustrated in FIG. 7.

More specifically, FIG. 12A illustrates a portion of the resonator of FIG. 6 including the matcher 630, and FIG. 12B illustrates a portion of the resonator of FIG. 7 including the matcher 730.

Referring to FIG. 12A, the matcher 630 may include the conductor 631, a conductor 632, and a conductor 633. The conductors 632 and 633 may be connected to the ground conducting portion 613 and the conductor 631. The impedance of the 2D resonator may be determined based on a distance h between the conductor 631 and the ground conducting portion 613. The distance h between the conductor 631 and the ground conducting portion 613 may be controlled by the controller. The distance h between the conductor 631 and the ground conducting portion 613 may be adjusted using a variety of schemes. For example, the variety of schemes may include a scheme of adjusting the distance h by adaptively activating one of the conductors 631, 632, and 633, a scheme of adjusting the physical location of the conductor 631 up and down, and the like.

Referring to FIG. 12B, the matcher 730 may include the conductor 731, a conductor 732, and a conductor 733. The conductors 732 and 733 may be connected to the ground conducting portion 713 and the conductor 731. The impedance of the 3D resonator may be determined based on a distance h between the conductor 731 and the ground conducting portion 713. The distance h between the conductor 731 and the ground conducting portion 713 may be controlled by the controller. Similar to the matcher 630 illustrated in FIG. 12A, in the matcher 730 the distance h between the conductor 731 and the ground conducting portion 713 may be adjusted using a variety of schemes. For example, the variety of schemes may include a scheme of adjusting the distance h by adaptively activating one of the conductors 731, 732, and 733, a scheme of adjusting the physical location of the conductor 731 up and down, and the like.

Although not illustrated in FIGS. 12A and 12B, the matcher may include an active element. A scheme of adjusting an impedance of a resonator using the active element may be similar to the examples described above. For example, the impedance of the resonator may be adjusted by changing a path of a current flowing through the matcher using the active element.

Figure 13:
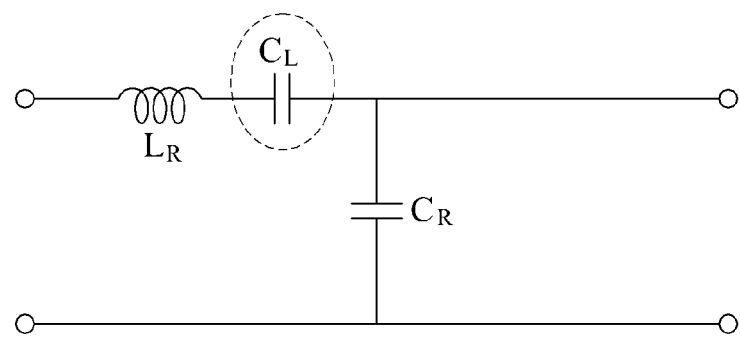
FIG. 13 is a diagram illustrating an example of an equivalent circuit of the resonator for a wireless power transmission of FIG. 6.

FIG. 13 illustrates an example of an equivalent circuit of the resonator 600 of FIG. 6.

The resonator 600 used in a wireless power transmission may be modeled to the equivalent circuit of FIG. 13. In the equivalent circuit of FIG. 13, $C_L$ denotes a capacitor that is inserted in a form of a lumped element in the middle of the transmission line of FIG. 6.

Here, the resonator 600 may have a zeroth resonance characteristic. For example, when a propagation constant is "0", the resonator 600 may be assumed to have $\omega_{MZR}$ as a resonance frequency. The resonance frequency $\omega_{MZR}$ may be expressed by Equation 2.

$$\omega_{MZR} = \frac{1}{\sqrt{L_R C_L}} \qquad \text{[Equation 2]}$$

In Equation 2, MZR denotes a Mu zero resonator.

Referring to Equation 2, the resonance frequency $\omega_{MZR}$ of the resonator 600 may be determined by $L_R/C_L$. A physical size of the resonator 600 and the resonance frequency $\omega_{MZR}$ may be independent with respect to each other. Since the physical sizes are independent with respect to each other, the physical size of the resonator 600 may be sufficiently reduced.

According to various example embodiments, a wireless power transmission apparatus may be provided to control a direction of a near field generated by a resonator.

Additionally, according to various example embodiments, it is possible to reduce an influence on peripheral apparatuses sensitive to a magnetic field.

Furthermore, according to various example embodiments, it is possible to reduce a change in a resonance frequency or a Q-factor of a resonator, by minimizing a ground effect.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A wireless power transmission apparatus, comprising:
a power resonator disposed between a substrate and a target apparatus and configured to transmit wireless power to the target apparatus; and
a material, configured to control a direction of a magnetic field of the power resonator, wherein a portion of the material has a High Impedance Surface (HIS) such that a magnetic field of the power resonator is in-phase with the material.

2. The wireless power transmission apparatus of claim 1, wherein the material controls a direction of the magnetic field of the source unit based on a location of the target apparatus.

3. The wireless power transmission apparatus of claim 1, wherein the material is designed so that a magnetic field of the power resonator is in-phase with respect to the material.

4. The wireless power transmission apparatus of claim 1, wherein the material comprises a U-shaped element comprising:
- a side portion configured to control a direction of a side magnetic field of the source unit; and
- a rear surface portion configured to control a direction of a rear surface magnetic field of the power resonator.

5. The wireless power transmission apparatus of claim 4, wherein the material further comprises a direction adjusting portion configured to adjust a direction of the side portion and a direction of the rear surface portion.

6. The wireless power transmission apparatus of claim 5, wherein the material controls the direction adjusting portion based on a location of a target resonator in the target apparatus.

7. The wireless power transmission apparatus of claim 1, wherein the material moves relative to the power resonator.

8. The wireless power transmission apparatus of claim 7, wherein the material moves according to a location of a target resonator in the target apparatus.

9. A method of transmitting wireless power, the method comprising:
- transmitting the wireless power from a power resonator to a target apparatus; and
- controlling a direction of a magnetic field of the power resonator with a material based on an in-phase characteristic of the magnetic field of the power resonator derived from a High Impedance Surface (HIS) of a portion of the material.

10. The method of claim 9, wherein the controlling of the direction of the magnetic field comprises moving the material relative to the power resonator.

11. The method of claim 10, wherein the material is moved according to a location of a target resonator in the target apparatus.

12. The method of claim 9, wherein the controlling comprises controlling the direction of the magnetic field of the power resonator with the material based on a location of the target apparatus.

* * * * *